Aug. 22, 1967  R. E. JACKSON  3,337,172
FIXTURE SUPPORTING BRACKET
Filed Oct. 24, 1965
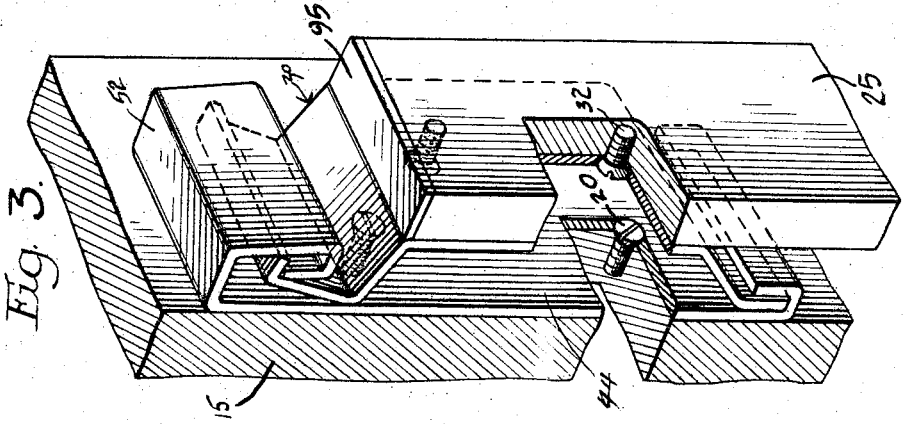
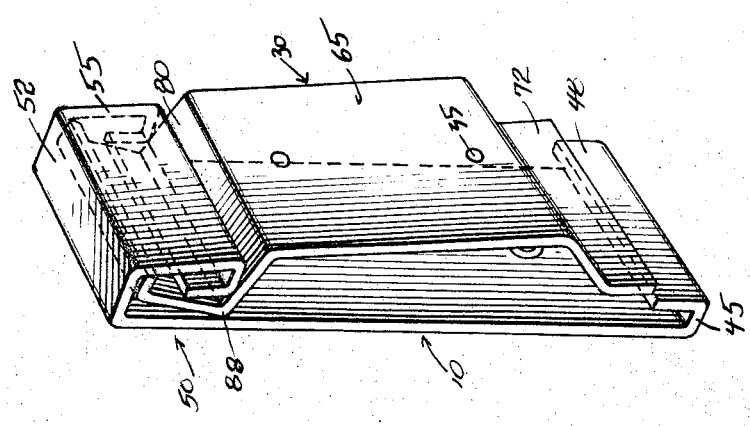
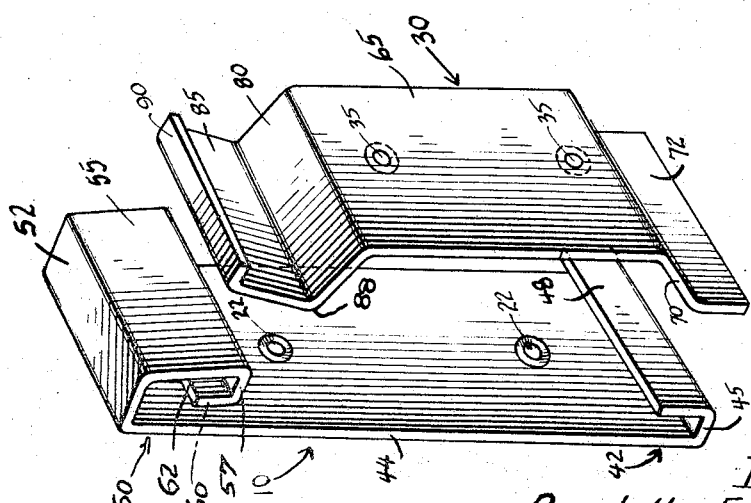
Inventor
Randall E. Jackson

United States Patent Office 3,337,172
Patented Aug. 22, 1967

3,337,172
FIXTURE SUPPORTING BRACKET
Randall E. Jackson, 2750 W. Jackson,
Chicago, Ill. 60612
Filed Oct. 24, 1965, Ser. No. 504,831
9 Claims. (Cl. 248—224)

The present invention relates to a bracket for facilitating attachment of a fixture to a wall or other supporting surface, and particularly to a two-piece bracket of the self-holding, readily assembled type.

Many types of brackets for aiding in the mounting of fixtures on walls or other supporting surfaces have been proposed. They have had varying degrees of success. However, none have so completely eliminated the need for skilled craftsmen or cabinet hangers, as does the present. The need for accurate measurements and correlation thereof to obtain the desired location of a fixture or cabinet on the wall is substantially eliminated by the present bracket. Even when skilled craftsmen are available, the bracket of the present invention facilitates the alignment and installation of the fixture relative to the supporting surface. Although the fixture installed with the present bracket is removable, it usually is securely mounted in a semi-permanent manner.

The two-piece bracket of the present invention relates to a support plate and a fixture plate to be supported thereon. The support plate is fixed to the supporting surface. The fixture plate is fixed to the fixture which is to be hung on the supporting surface. The two components are then placed together so as to hold the fixture in place. The present bracket is ideally suited for supporting relatively heavy fixtures, such as a wall cabinet, intended for semi-permanent installation. Such installation relates to fixtures which may be readily removed, and again rehung or replaced when desired, although normally intended to remain in place for extended periods.

Objects of the present invention will be appreciated from the following description and the drawings wherein:

FIGURE 1 is a perspective view of the components of the bracket shown separated;

FIGURE 2 is a perspective view of the bracket partially assembled; and

FIGURE 3 is a perspective view of a modification of the bracket, shown assembled.

Disclosed in FIG. 1 is a support plate 10, forming one component of a bracket. This plate is intended to be fixedly mounted to a support surface 15, usually of the substantially vertically extending type, such as a wall. (See FIG. 3.) Fastening of the support plate 10 to the wall is accomplished by any type of known fastener, such as screws 20, which are passed through holes 22 in the plate. The fasteners are selected so that they will have sufficient strength and holding power to support a fixture 25 which is to be mounted thereon. The plates comprising the bracket are preferably formed from metal sheet material.

For purposes of the present description, the fixture 25 is a typical wall cabinet intended to be hung on a wall 15. A fixture plate 30 is attached to the cabinet by passing fasteners 32 through holes 35 in the plate. To fixedly mount cabinet 25 on the wall, the fixture plate is interlocked with the support plate 10.

The elongated support plate 10 has a substantially planar, generally rectangular body portion 44 through which the fasteners are passed. The lower end of the support plate is formed as a trough 42 for receiving the cooperating portion of the fixture plate 30. A perpendicularly extending portion 45 is bent from the body portion 44 to restrain the fixture plate against downward movement when the plates are interlocked. From the portion 45 upwardly extends flap portion 48 which prevents the end of the other plate from moving forward from the support plate when the plates are interlocked.

The upper end of the support plate 10 defines a bracing portion 50 which includes a straight portion 52, which is substantially parallel with the straight portion 45 on the lower end. Extending at a slightly obtuse angle from the straight portion 52 is a depending angled portion 55. A connecting portion 57 and an upturned portion 60 terminating as a ledge 62 extend from the downwardly extending portion 55 so as to receive the upper end of the fixture plate 30 and brace it against forward and downward movement.

Referring now to the fixture plate 30, this plate has a substantially planar and generally rectangular body portion 65. An offset 70 is formed near the lower end of this body portion. From it extends a restraining leg 72 which is adapted to engage the flap 48 of the support plate 10 when the plates are interlocked as seen in FIG. 3.

The other end of the fixture plate 30, which is to be received in the bracing portion 50 of support plate 10, is disposed generally at an angle to the body portion 65. A short length 80 extends at an obtuse angle relative to the plane of the body portion. From this short length extends an upright portion 85. A ledge engaging leg 90 extends from this upright portion 85 at substantially 90° thereto, thereby forming a bend 88.

The length of the fixture plate 30 is seen to be slightly less than that of the interior of the support plate 10. This difference permits movement of the fixture plate within the support plate for assembly, and if desired, removal. The lengths are long enough, however, to cause the plates to be retained in interlocking engagement when assembled together.

The purpose of the portions of the respective plates is best seen when considering a typical installation of a cabinet 25 on a wall 15. One or more support plates 10 are mounted along a predetermined line on the wall. A fixture plate 30 is positioned on the fixture in substantial alignment with each support plate. The fixture is lifted toward the wall and inclined relative thereto so as to slip portion 90 between the body portion and the ledge portion 62 of support plate 10. The leg portion 90 is shifted upwardly until it clears the portion 60 of the support plate, substantially as seen in FIG. 2.

The lower end of the fixture and therefore the fixture plate 30 is then moved to a position almost parallel with the wall 15. The restraining leg portion 72 depending from the body of the fixture plate is then moved to the position as seen in FIG. 2. Leg 72 can now pass over the upright flap portion 48. As this maneuver is occurring, the bend 88 between the portion 85 and the short length 80 is forced to engage the body portion 44 of the support plate 10 thereby creating a slight biasing of the plate to urge the leg 72 forwardly. Slight additional force will overcome this pressure so that leg 72 is moved beyond flap 48 as the fixture plate is lowered. Simultaneously with this lowering, the ledge engaging portion 90 of the fixture plate 30 moves downwardly to engage the ledge 62 of the upturned portion 60. The fixture is now fixedly retained upon the supporting surface 15.

As is readily understood, the supported fixture is made secure against motion away from the support surface by the biasing of the bend or angled portion 88 against the body portion 44 of support plate 10, and the retention of the leg 72 behind flap 48. Security against downward movement is provided by the bracing structure interlock and the portion 45 of the trough 42.

A modification of the bracket permitting even a quicker installation of a fixture is seen in FIG. 3. An alignment lug 95 extends from fixture plate 30 at the juncture of the top of the body portion and the short length 80. This lug permits quick alignment of the fixture plate relative to the top of the fixture. By bringing the lug 95 and the body portion 65 of the fixture plate into engagement with the appropriate corner portions of the fixture, precise determinations can be made of the position to which the fixture will be raised when the plates are interlocked.

While I have described my invention as a preferred embodiment and a modification, other modifications may be made without departing from the spirit of the invention.

I claim:

1. In a bracket for securing a fixture to a supporting surface, the invention comprising:

first and second plates having end portions adapted to be interlocked;

said first plate including:
a substantially flat body portion adapted to be fixed to a supporting surface;
a lower end portion shaped to receive the lower end portion of said second plate and to restrain same against movement in forward and downward directions relative to said body portion;
a flap portion on said lower end portion defining the forward restraining portion of an upwardly open trough;
an upper end portion shaped to receive the upper end portion of said second plate and to restrain same against movement in said two directions;
a ledge portion on said upper end extending substantially parallel with said body portion and defining said downward restraining portion; and said second plate including:
a substantially flat body portion adapted to be fixed to a fixture;
a portion on said upper end of said plate for engaging said ledge portion to prevent movement of said second plate in said downward direction when said plates are interlocked; and
a portion extending from said lower end portion of said second plate for positioning in said trough behind said flap portion of said first plate when said plates are interlocked.

2. A bracket as in claim 1 including means extending from said second plate to align a fixture on said plate when said fixture engages same.

3. A bracket as in claim 2 wherein said aligning means is a lug portion extending from the upper end of said second plate.

4. A bracket as in claim 1 wherein said upper end portion of said first plate includes a portion angularly related to said body portion and said ledge portion with which it is connected, and said second plate includes a portion for engaging said angularly related portion when said plates are interlocked.

5. A bracket as in claim 1 wherein said second plate is shaped to engage said body portion of said first plate adjacent the upper end portion thereof, whereby said second plate is urged against said flap portion of said first plate when said plates are interlocked.

6. A bracket as in claim 5 wherein said first plate engaging portion of said second plate is formed as substantially a 90° angle intermediate said ledge engaging portion and said body portion.

7. A bracket as in claim 1 wherein said portion of said second plate for positioning in said trough of said first plate is substantially parallel to and offset from said body portion.

8. In a bracket for securing a fixture to a supporting surface, the invention comprising:

first and second plates having end portions adapted to be interlocked;

said first plate including:
a substantially flat body portion adapted to be fixed to a supporting surface;
a lower end portion shaped to receive the lower end portion of said second plate and to retain same against movement in forward and downward directions relative to said body portion;
a flap portion on said lower end portion defining the forward restraining portion of an upwardly open trough;
an upper end portion shaped to receive the upper end portion of said second plate and to restrain same against movement in said two directions;
a ledge portion on said upper end extending substantially parallel with said body portion and defining said downward restraining portion;
an interconnecting portion angularly related to said ledge portion and said body portion; and said second plate including:
a substantially flat body portion adapted to be fixed to a fixture;
a portion on said upper end of said plate for engaging said ledge portion and said interconnecting portion of said first plate to prevent movement of said second plate in both said directions when said plates are interlocked;
a portion extending from said lower end portion of said second plate for positioning in said trough behind said flap portion of said first plate when said plates are interlocked; and
an angled portion intermediate said upper end portion and said body portion engaging said first plate when said plates are interlocked for causing said lower end portion to be urged against said flap portion of said first plate.

9. A bracket as in claim 8 including means extending from said second plate to align a fixture on said plate when said fixture engages same.

References Cited

UNITED STATES PATENTS

| | | | |
|---|---|---|---|
| 1,887,159 | 11/1932 | Knight | 248—489 |
| 2,127,230 | 8/1938 | Moineau | 248—224 |
| 2,501,147 | 3/1950 | Tolan | 248—232 X |
| 2,733,887 | 2/1956 | Schmidt | 248—223 |
| 2,891,757 | 6/1959 | Lang | 248—224 |

ROY D. FRAZIER, *Primary Examiner.*

JOHN PETO, *Examiner.*